United States Patent Office 2,740,247
Patented Apr. 3, 1956

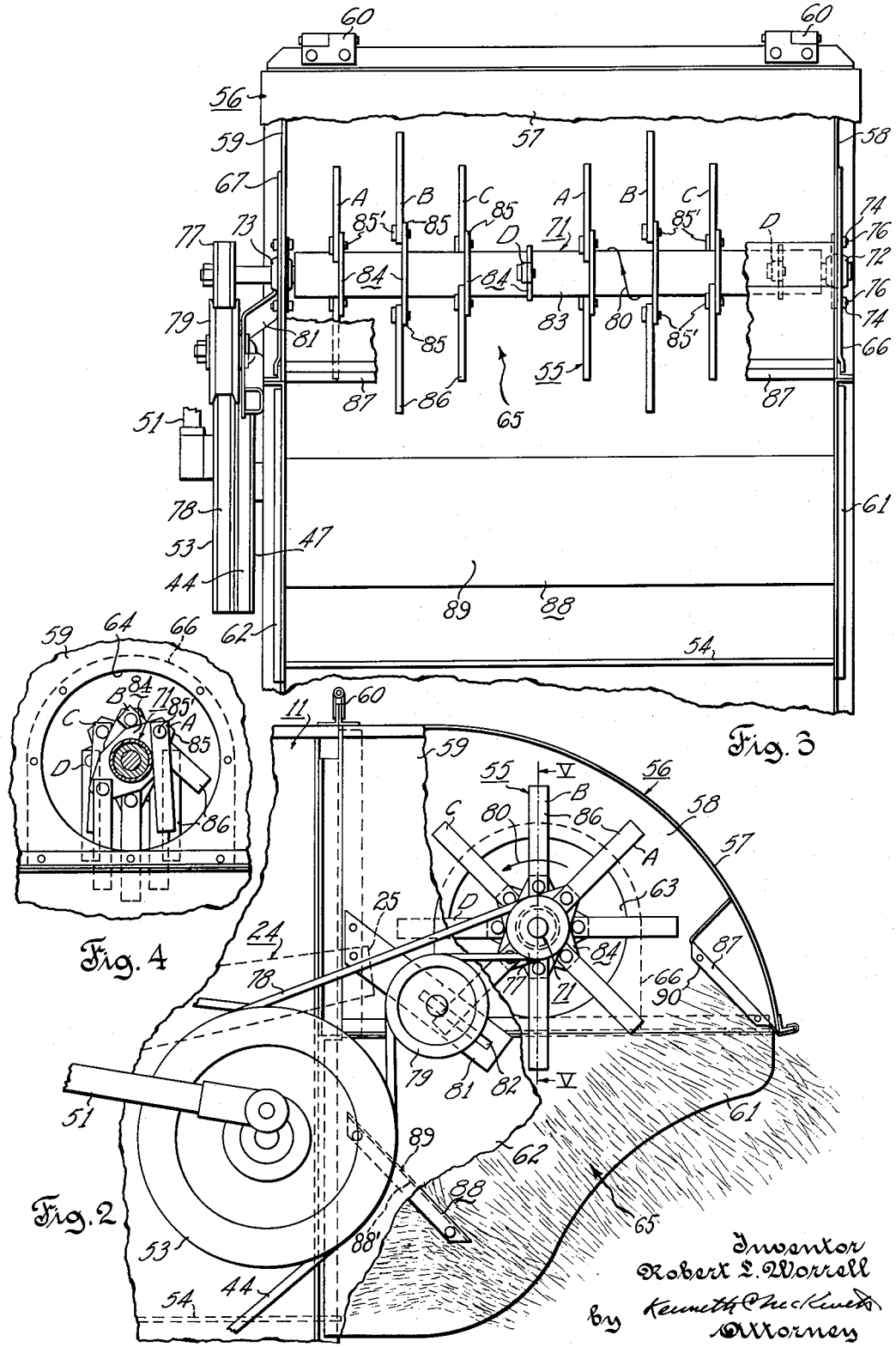

2,740,247

STRAW SPREADER FOR COMBINES

Robert L. Worrell, La Porte, Ind., assignor to Allis-Chalmers Manufacturing Company, Milwaukee, Wis.

Application November 3, 1952, Serial No. 318,489

6 Claims. (Cl. 56—122)

This invention relates to combine harvesters, and it is more particularly concerned with a spreader for the straw which is discharged from such harvesters upon the field.

In the harvesting of grain, it is a common practice to return the straw separated from the kernels of grain to the ground, and it is desirable that the discharged straw be spread out sufficiently to form a thin and generally uniform layer on the ground which layer can be readily plowed under to form fertilizer and mulch. Generally, it is an object of the invention to provide an improved spreading mechanism which will uniformly distribute straw discharged from a combine harvester.

More specifically, it is an object of this invention to provide a straw spreader of the mentioned character which is particularly applicable to a combine harvester of the type wherein the straw rack is positioned and oscillates in a general direction transverse to the normal direction of travel of the combine harvester.

A further object of this invention is to provide a straw spreader of the hereinabove mentioned character which will throw the discharged straw laterally and downwardly away from the combine and cause distribution of the discharged straw over a strip of land as wide, or approximately as wide, as the width of cut of the combine.

It is a further object of this invention to provide a straw spreader which is substantially enclosed within the existing straw hood on the harvester so that the moving parts of the spreader are shielded and persons are protected from inadvertent contact therewith.

It is a further object of this invention to provide a straw spreader which is readily detachable from a combine harvester so that it will be possible, if desired, to use a straw chopping, bundling, baling or windrowing attachment in place of the straw spreader.

It is a further object of this invention to provide a straw spreader attachment which can be readily mounted in the straw hood on combine harvesters and which straw spreader is economical to manufacture and efficient in operation.

It is a further object of this invention to provide a self-clearing straw spreader and which spreader acts as a positive feeding device for removing straw from the discharge end of a combine harvester straw rack.

Further objects and advantageous features of the present invention will be apparent from the description and accompanying drawings, and will be more particularly pointed out in the claims.

In the accompanying drawings:

Fig. 2 is a partial rear elevation of the combine harvester shown in Fig. 1 with some parts broken away for clarity of illustration;

Fig. 3 is a side elevation of a portion of the combine harvester shown in Fig. 1 with some parts broken away for clarity of illustration;

Fig. 4 is a fragmentary view similar to Fig. 2 with the shaft shown in section and with some parts removed for the purpose of illustrating the manner in which the straw spreader is removed from the straw hood.

Figure 1:
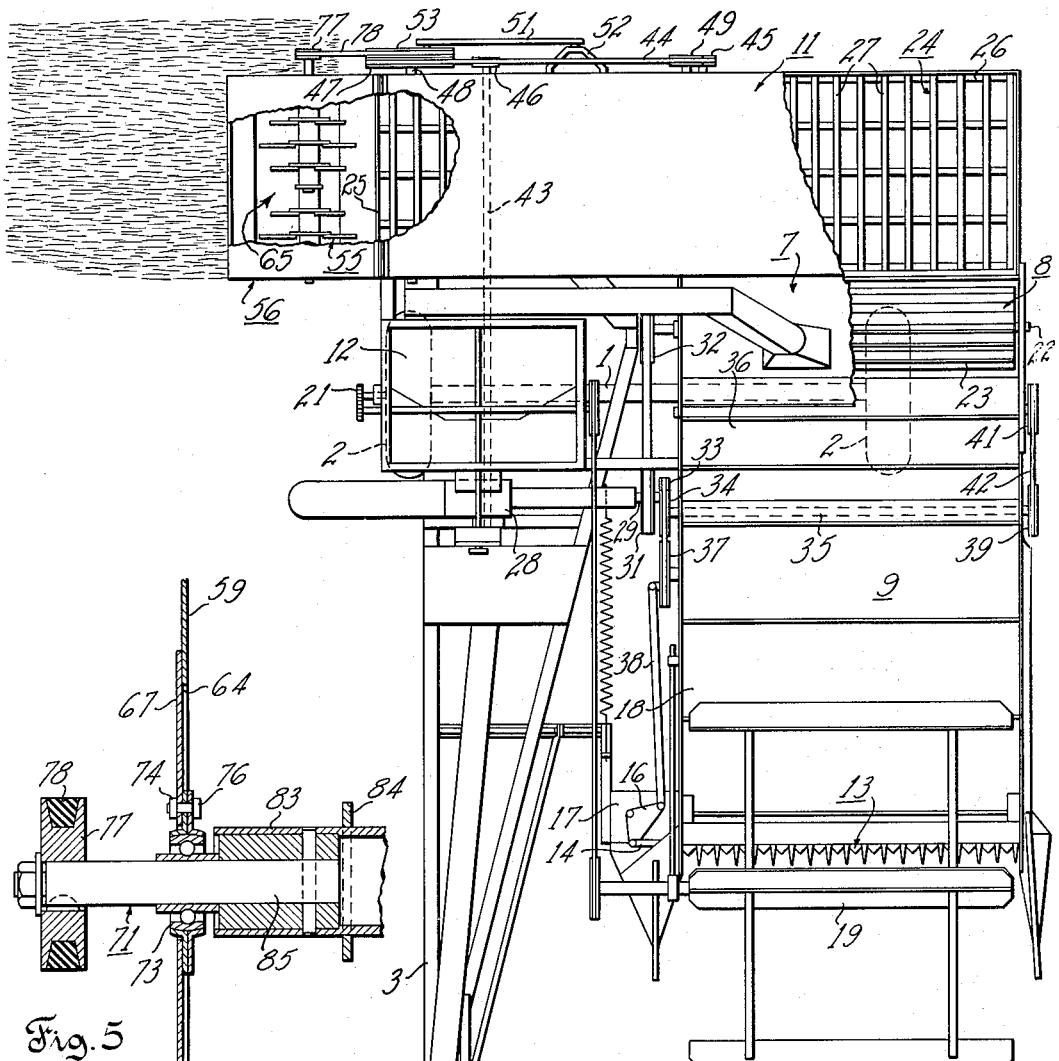
Fig. 1 is a plan view with some parts broken away of a tractor drawn, power take-off operated combine harvester embodying the invention.

Referring to the drawings and particularly Fig. 1 it is seen that the invention in its preferred form has been embodied in a combine harvester of the type disclosed in the patent to Dray, U. S. 2,262,453, issued November 11, 1941, which may be referred to if greater details of construction are desired than are hereinafter recited.

This combine harvester includes a main support 1 which may be in the form of a steel tube carrying journals for the support of traction wheels 2 and such tube extends transversely of the normal direction of travel of the harvester. On this tubular support 1 are mounted an auxiliary supporting structure of a fabricated character and including a forwardly projecting frame 3 serving as a drawbar support through which tractive effort of a source of traction, such as tractor 4, may be applied through a suitable coupling (not shown) at the forward end of frame 3. The frame 3 also serves as a support for a power shaft assembly 6 which has a forward driving connection with a rear power take-off shaft, not shown, on tractor 4 and which drives the several mechanisms of the harvester. Also mounted on the support 1 is a framework on which are carried several major components of the harvester, such as the supporting and enclosing housing 7 for the threshing mechanism 8, with a header assembly 9 pivotally carried at its rearward end by the latter housing, and a separator housing 11 communicating with the discharge side of housing 7 for the threshing mechanism 8 and extending transversely thereof and likewise transversely or crosswise of the direction of travel of the combine harvester during normal operation thereof, and a storage bin 12 for clean grain.

At the forward end of the header assembly 9 adjacent the bottom thereof is mounted a sickle device 13 of conventional design, as in the form of relatively movable cooperative cutting knives, and an actuator rod 14 for this sickle device is pivotally attached to an actuating plate 16 pivotally mounted on a laterally extending plate 17 carried by the header assembly.

Mounted within the header assembly adjacent to the lower edges of the side walls thereof is a travelling conveyer 18 of the draper belt type, preferably provided on its working surface with crossbars serving to catch and hold loose grain. This belt is of a width equal to substantially the full length of the sickle device. This conveyer is power driven so that the upper flight thereof moves rearwardly from just rearwardly of the sickle device to the rear end of the header assembly at a point where same is joined to housing 7. A rotatable gathering reel 19 is mounted on the header assembly in operative relation to the sickle device and the traveling draper. This reel is connected by suitable conventional driving means to a sprocket 21 carried by stubble side wheel 2 to be ground driven thereby.

The threshing mechanism indicated generally at 8 comprises an operating shaft 22 and a plurality of spaced annular members mounted thereon, with the peripheral flanges turned over and having a plurality of spaced thresher bars 23 attached thereto. Beneath the threshing cylinder in coacting relation thereto is mounted a stationary concave member (not shown).

Separator housing 11 is provided with devices for shaking the straw and threshed grain delivered from the threshing cylinder and recovering the threshed grain therefrom, these devices including a straw shaking rack 24 extending the full length and approximately the full width of the separator housing. The straw rack 24 includes a frame comprising side members 26 interconnected by a plurality of slats 27. This straw rack is mounted in the separator housing for oscillating movement relative thereto and for moving straw through the housing toward the discharge outlet position at the stubbleward end of housing 11.

Power is supplied to the several mechanisms in the combine harvester by the power shaft assembly 6 which, as stated, is operatively connected at its forward end to a rear power take-off shaft, not shown, on tractor 4. At its rearward end power shaft assembly 6 is drivingly connected to a gear box 28 carried by frame 3. Gear box 28 is provided with a transversely extending shaft 29 supported on frame 3, and shaft 29 is provided with a V-groove pulley 31, the latter being connected with a V-groove pulley 32 on the operating shaft 22 of the threshing cylinder, through suitable belting. A second V-groove pulley 33 is mounted on shaft 29 and is belt connected to a V-groove pulley 34 on the operating shaft 35 of the upper roller of a feeding draper conveyor 36, and to a V-groove pulley 37 mounted on the stubbleward side wall of the header assembly. The pulley 37 drives a pitman 38 through an eccentric on the pulley, the pitman actuating the sickle device through its connection with the actuating plate 16 and the operating rod 14 of the sickle.

A V-groove pulley 39 on the opposite end of shaft 35 of the upper roller of upper feeding draper 36 and a V-groove pulley 41 on the top shaft of the main draper conveyer 9 are connected with each other through a crossed V-belt 42, thus imparting the desired direction of travel to the main draper conveyer 9.

Power is supplied to the separating mechanism from a shaft 43, which extends rearwardly from gear box 28 and is geared within the latter to shaft assembly 6. A V-belt 44 cooperates with a V-groove pulley 46 on the rear end of shaft 43, and with a V-groove pulley 45 on the shaft of a fan (not shown), and also with a V-groove pulley 47 on the driving shaft 48 of a grain drag (not shown). An adjustable idler pulley 49 is mounted on the rear wall of the separator housing and serves to establish the desired driving tension on belt 44.

The shaft 48 is provided at the ends thereof (only one of which is shown in Fig. 1) with an eccentric connection to pitmans 51, one at each side of the separator housing, the other ends of these pitmans being connected to the lower ends of shaker arms 52 which impart the desired shaking motion to the straw rack 24 and to an underlying cleaning device (not shown). A sheave 53 attached to shaft 48 adjacent sheave 47 may be used as a portion of one of these eccentric connections to the adjacent pitman.

The apparatus thus far described essentially conforms with that shown and more particularly described in the aforementioned patent to Dray, U. S. 2,262,453, it being sufficient in this connection to point out that as the harvester is moved through a field, standing grain is cut by sickle 13 and by the action of reel 19, the cut grain is deposited on conveyer 18 from whence the cut grain is transported rearwardly ultimately aided by upper conveyer 36 and presented to threshing mechanism 8 which threshes the grain kernels from the heads and deposits the straw and grain kernels on the grainward end of the straw rack 24. The straw and grain kernels are moved transversely and shaken by the reciprocating action of the straw rack and the grain kernels pass between slats 27 along with some chaff to an auxiliary cleaner (not shown). The straw is moved transversely until it drops off of the stubbleward or discharge end 25 of the straw rack 24. The grain kernels are separated from the chaff by passing same over a cleaning device (not shown) which includes a grate 54 (see Fig. 2) positioned at the stubbleward end of the separator housing, having a blast of air passing upwardly therethrough and which air blows the chaff out of the machine while any heavier grain heads will drop through the grate to be returned to the threshing mechanism for further threshing.

Referring now to Figs. 2 and 3, the improved straw spreading device is generally designated by the reference character 55 and is carried in a straw hood 56 at the stubbleward end of the separator housing 11. This straw hood is swingably suspended on hinges 60 and includes a curved cover portion 57, and sides 58 and 59 defining a downwardly directed straw discharge aperture 65. The sides 58 and 59 are attached to the edges of such upper cover portion and a pair of lower shields 61 and 62 are attached at their upper edges to sides 58 and 59, respectively. Sides 58 and 59 are provided with circular openings 63 and 64, respectively (see Figs. 2 and 4), which are covered by side plates 66 and 67, respectively; the side plates 66 and 67 being removably attached to the respective sides 58 and 59, as by means of nuts 68 and bolts 69 (see Fig. 5).

A shaft 71 is rotatably supported in ball bearing assemblies 72 and 73 removably attached to side plates 66 and 67 as by means of nuts 74 and bolts 76 (see Fig. 3). Attached to one end of shaft 71 is a sheave 77 connected in driven relation to sheave 53 by means of a V-belt 78. An idler sheave 79 is adjustably mounted on a bracket 81 (see Figs. 2 and 3) for tensioning the belt 78. Sheave 79 can be moved along slot 82 in bracket 81 and secured in any desired position therealong to provide the desired driving tension in belt 78. It is to be noted that shaft 71 rotates in the direction indicated by arrow 80 in Figs. 2 and 3 to provide an efficient uniform spreading action.

Figure 5:
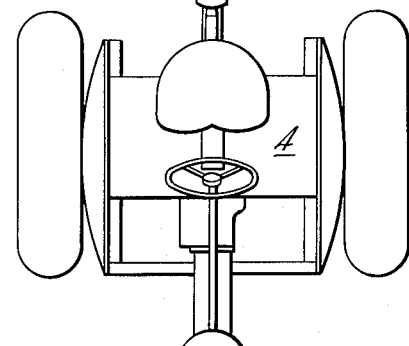
Fig. 5 is a fragmentary section view taken on line V—V of Fig. 2.

Referring to Figs. 3 and 5, it is seen that shaft 71 is made up of a tube section 83 and two journal sections 85 which are suitably secured to opposite end portions, respectively, of the tube section 83. A series of flange members 84 are rigidly fastened to and spaced from each other axially of the tube section 83. Each of the flange members 84 is provided with a pair of diametrically opposed ear portions 85, and on each of these ear portions (by conventional means comprising a pivot bolt 85') is pivotally mounted a flail member 86 for pivotal movement about an axis parallel to the axis of shaft 71. Fig. 4 indicates these flail members in relation to their respective flange members as they appear when the shaft 71 is not rotating. Figs. 1, 2 and 3 all show the flail members 86 as positioned when shaft 71 is rotating at operating speed. The flail members are positioned in spirally progressive phases about shaft 71. For example, referring to Fig. 3 the first flail member to the left is indicated as being in phase A, the flail member adjoining is in phase B, the next is in phase C and the next in phase D. The following flail member is in phase A again, and so forth.

Referring to Fig. 2 it is seen that shaft 71 is mounted with its axis of rotation substantially lying in the same horizontal plane as the upper surface of the discharge end of straw rack 24 and during rotation the peripheral ends of flail members 86 are in proximate relation to the discharge end 25 of the straw rack 24.

Straw hood 56 is also provided with a straw deflector 87 which extends upwardly and inwardly from the bottom edge of the curved cover 57. At its longitudinally opposite ends the deflector 87 is secured to sides 58 and 59 of the hood 56. The purpose of the deflector 87 is to direct groundwardly any straw which may be thrown against the deflector by flail members 86.

Side shields 61 and 62 support a chaff deflector 88 which extends longitudinally therebetween and which is downwardly inclined in a laterally outward direction at substantially the same angle to a horizontal plane as straw deflector 87. The chaff deflector surface 88' of chaff deflector 88 guides the chaff blown off of grate 54 groundwardly so as not to interfere with the direction of movement of the straw being impelled by flails 86, and the upper surface 89 of the chaff deflector functions as an additional straw deflector preventing interference of straw with the chaff (see Fig. 2.)

The operation of spreading device 55 is as follows: During operation of the harvester a steady stream of chaff is blown over grate 54 which chaff strikes the under surface 88' of chaff deflector 88 and is deflected downwardly to the ground (as shown in Fig. 2) uniformly covering the ground surface closely adjacent to the discharge end of the separator housing with chaff. A steady stream of straw is discharged over the stubbleward end of the straw rack 24 and which straw is contacted by the flails 86 and impelled thereby in the tangential paths indicated in Fig. 2 with some of the straw striking and deflecting off the upper surface 89 of chaff deflector 88 and with some of the straw being deflected off of straw deflector surface 90 of straw deflector 87 to the end of uniformly distributing the straw and chaff over a strip of land as wide, or approximately as wide, as the width of cut of the sickle 13. The stream of material leaving the hood 56 is substantially as wide in the direction of travel as the width of the separator housing 11.

From the foregoing, it is seen that a harvester utilizing applicant's straw spreader will leave a field that has been harvested with the straw uniformly returned to the ground making subsequent soil working easy.

Another advantage of this straw spreader is that all working parts are shielded so that the danger of a person coming inadvertently into contact with the flails is substantially eliminated. In conventional straw spreaders which are operated in a horizontal plane protective shielding could not readily be effected because it would interfere with proper distribution of the straw.

Another advantage of the herein disclosed straw spreader is that it can be readily removed from the straw hood in case the operator wishes to use a different type of attachment such as a baling or bunching device, or a straw chopper. The steps in such a removal are as follows: The harvesting machine is stopped causing the flails 86 to assume a position such as that shown in Fig. 4. The belt tensioning idler sheave 79 is then loosened on its support until the belt 78 can be slid off of sheave 77. The nuts 74 and bolts 76 which fasten bearing 72 to plate 66 (see Fig. 3), and the nuts 68 and bolts 69 which fasten plate 67 to side 59 are removed (see Fig. 5). The straw spreader 55 can now be moved longitudinally through opening 64 in side 59 (see Fig. 5). During this moving process it will be necessary at times to raise the straw spreader so that the depending flails 86 will clear the lower edge of opening 64. After the spreading device has been so removed from the straw hood, cover members (not shown) can be fastened into sides 58 and 59 to cover the openings formerly occupied by bearing 72 and plate 67. The steps required to install the straw spreader into the hood would be the aforementioned steps in reverse.

A further advantage of the herein disclosed straw spreader is that the flails provide a positive feeding of the straw from the discharge end of the straw rack, which prevents the straw clogging up at that point. In addition, the hammer-mill-like flails prevent straw from wrapping around the straw spreader rotor. Rigidly mounted flails will operate successfully but applicant in his preferred embodiment utilizes pivotally mounted flails because same provide the foregoing advantages which outweigh the additional cost of construction.

It should be understood that the invention claimed herein is not limited to the exact details of design and construction disclosed, and it is contemplated as including modification within the scope of the appended claims.

It is claimed and desired to secure by Letters Patent:

1. In a traveling harvesting machine of the type comprising a transversely extending reciprocably mounted straw rack and a straw hood having cover and side wall portions in overhanging shielding relation to the discharge end of said straw rack and defining a downwardly directed straw discharge aperture at the stubbleward side of said machine, the improvement comprising a shaft journaled in said hood on an axis extending in the direction of harvester travel and in horizontally opposed relation to said discharge end of said straw rack, means operative to rotate said shaft so that the upper surface thereof moves toward said straw rack, and a plurality of flails connected at one end to said shaft for rotation therewith in axially spaced vertical planes at right angles to the direction of harvester travel, said flails being of a length such that the free ends thereof pass closely adjacent to said discharge end of said straw rack when said shaft is rotated.

2. In a harvesting machine the combination recited in claim 1 and a chaff deflector mounted within said straw hood at said straw discharge aperture of the latter and at the same side of said shaft as said discharge end of said straw rack, said chaff deflector presenting an upper straw deflecting surface inclined to direct straw downwardly and transversely away from said machine.

3. In a harvesting machine the combination recited in claim 1 and a straw deflector mounted within said straw hood at the side of said shaft remote from said straw rack and adjacent to said straw discharge aperture, said straw deflector presenting an inclined straw engaging surface extending downwardly in a direction transversely away from said straw rack.

4. In a traveling harvesting machine of the type comprising a transversely extending reciprocably mounted straw rack and a straw hood having upper cover and side wall portions in overhanging shielding relation to the discharge end of said straw rack and defining a downwardly directed straw discharge aperture at the stubbleward side of said machine, the improvement comprising a shaft journaled in said hood on an axis extending in the direction of harvester travel and in horizontally opposed relation to said discharge end of said straw rack, means operative to rotate said shaft so that the upper surface thereof moves toward said straw rack, a plurality of flails connected at one end to said shaft for rotation therewith in axially spaced vertical planes at right angles to the direction of harvester travel, a chaff deflector mounted within said hood at said straw discharge aperture of the latter and at the same side of said shaft as said discharge end of said straw rack, said chaff deflector presenting an upper straw deflecting surface inclined to direct straw downwardly and transversely away from said machine, and a straw deflector mounted within said hood at the side of said shaft remote from said straw rack and adjacent to said straw discharge aperture, said straw deflector presenting an inclined straw engaging surface extending generally parallel to the straw deflecting surface of said chaff deflector.

5. In a traveling harvesting machine of the type comprising a transversely extending reciprocably mounted straw rack and a straw hood having curved cover and side wall portions in overhanging shielding relation to the discharge end of said straw rack and defining a downwardly directed straw discharge aperture at the stubbleward side of said machine, the improvement comprising a shaft journaled in said hood on an axis extending in the direction of harvester travel and in horizontally opposed relation to said discharge end of said straw rack, means operative to rotate said shaft so that the upper surface thereof moves toward said straw rack, a plurality of flails connected at one end to said shaft for rotation therewith in axially spaced vertical planes at right angles to the direction of harvester travel, a chaff deflector mounted within said hood at said straw discharge aperture of the latter and at the same side of said shaft as said discharge end of said straw rack, said chaff deflector presenting an upper straw deflecting surface inclined to direct straw downwardly and transversely away from said machine, and a straw deflector mounted within said hood at the side of said shaft remote from said straw rack and adjacent to said straw discharge aperture, said straw deflector presenting an inclined straw engaging surface extending generally parallel to the straw deflecting surface of said chaff deflector, said straw engaging surface being so positioned that the free ends of said flails pass closely adjacent to said straw engaging surface when said shaft is rotated.

6. In a traveling harvesting machine of the type comprising a mechanism for separating straw from grain and a straw hood having cover and side wall portions in overhanging shielding relation to the straw discharge end of said mechanism and defining a downwardly directed straw discharge aperture, the improvement comprising a shaft journaled in said side wall portions on a horizontally extending axis in opposed relation to the straw discharge end of said mechanism, means drivingly connected with said harvesting machine for rotating said shaft, and a plurality of flails connected at one end to said shaft for rotation therewith in axially spaced vertical planes, said flails being of a length such that the free ends thereof pass closely adjacent to said discharge end of said mechanism in coacting relation to said discharge end for removing straw therefrom.

References Cited in the file of this patent

UNITED STATES PATENTS

| | | |
|---|---|---|
| 1,844,344 | Breedon | Feb. 9, 1932 |
| 2,262,453 | Dray | Nov. 11, 1941 |
| 2,327,893 | Hobson | Aug. 24, 1943 |
| 2,554,669 | Elofson | May 29, 1951 |
| 2,585,296 | Bennett et al. | Feb. 12, 1952 |
| 2,626,159 | Thompson | Jan. 20, 1953 |

FOREIGN PATENTS

| | | |
|---|---|---|
| 31,415 | Germany | Jan. 10, 1908 |